US009088962B2

(12) United States Patent
Amiri et al.

(10) Patent No.: US 9,088,962 B2
(45) Date of Patent: Jul. 21, 2015

(54) WAP SUPPORTING COMPLEMENTARY SUBNETS IN A WLAN

(71) Applicant: Quantenna Communications, Inc., Fremont, CA (US)

(72) Inventors: Bahador Amiri, Los Gatos, CA (US); Hossein Dehghan, Diablo, CA (US); Qasem Aldrubi, Fremont, CA (US); Sam Heidari, Los Altos Hills, CA (US)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 14/229,833

(22) Filed: Mar. 28, 2014

(65) Prior Publication Data

US 2014/0293983 A1    Oct. 2, 2014

Related U.S. Application Data

(60) Provisional application No. 61/806,332, filed on Mar. 28, 2013.

(51) Int. Cl.
*H04W 4/00* (2009.01)
*H04W 74/00* (2009.01)
*H04W 84/12* (2009.01)

(52) U.S. Cl.
CPC ............ *H04W 74/002* (2013.01); *H04W 84/12* (2013.01)

(58) Field of Classification Search
USPC ................................... 370/312, 329, 343, 344
See application file for complete search history.

(56) References Cited

U.S. PATENT DOCUMENTS

| 5,642,360 | A | * | 6/1997 | Trainin | 370/230 |
| 2003/0211866 | A1 | * | 11/2003 | Narazaki et al. | 455/561 |
| 2005/0037764 | A1 | * | 2/2005 | Trachtman | 455/450 |
| 2006/0035589 | A1 | * | 2/2006 | Shvodian | 455/18 |
| 2006/0268823 | A1 | * | 11/2006 | Kim et al. | 370/349 |
| 2008/0170545 | A1 | * | 7/2008 | Kim et al. | 370/329 |
| 2009/0221288 | A1 | * | 9/2009 | Zhang et al. | 455/434 |
| 2010/0254295 | A1 | * | 10/2010 | Ahn et al. | 370/312 |

OTHER PUBLICATIONS

Sigurd Schelstraete; "An Introduction to 802.11ac" White Paper Quantenna Communications, Inc., Sep. 2011.

(Continued)

*Primary Examiner* — Peter Cheng
(74) *Attorney, Agent, or Firm* — IP Creators; Charles C Cary

(57) ABSTRACT

A wireless access point (WAP) including: a station set identifier and a subnet controller. The station set identifier is configured to identify at least one set of at least two station nodes among the plurality of station nodes and complementary communication options for each station in the at least one set which facilitate concurrent communications between the WAP and the stations in the set. The subnet controller is configured both to generate subnets equal in number to a number of stations in at least one set, and for each subnet an associated beacon channel discrete from the beacon channels of other subnets, together with any required aggregate channels matching each station's identified communication option and an associated medium access control, and further to control transmission of data from the WAP to the at least two station nodes concurrently on the associated subnets.

9 Claims, 7 Drawing Sheets

(56) References Cited

OTHER PUBLICATIONS

IEEE Computer Society, IEEE Std 802.11-2012; "IEEE Standard for Information Technology—Telecommunications and Information Exchange between Systems—Part 11: Wireless LAN Medium Access Control (MAC) and Physical Layer (PHY) specifications" Mar. 29, 2012.
D.Gesbert,M.Kountouris,R.W.Heath, Jr., C.B.Chae, and T.Salzer, "From Single User to Multiuser Communications: Shifting the MIMO paradigm", IEEE Signal Processing Magazine, vol. 24, No. 5, pp. 36-46, Oct. 2007.
A. Ghosh et. al. "Fundamentals of LTE" Book, 2011, Pearson Education, Inc Chapter 6, pp. 227-256.
Alcatel-Lucent, "The LTE Network Architecture" Paper, 2009 Alcatel-Lucent.
JDSU, "LTE Phy Layer Measurement Guide" Paper, JDSU, Sep. 2011.
Anritsu, "LTE Resource Guide", Paper, Anritsu 2009.
Y. Shapira, "SixtySec LTE QoS—What is it ?"; Web-Video, May 28, 2012; ScreenPrint, Explore Gate; YouTube Video URL=http://youtu.be/Qa96DXZviY0.
Y. Shapira, "SixtySec From OFDM to OFDMA"; Web-Video; Date Posted: May 1, 2012; ScreenPrint; Explore Gate; YouTube Video URL=http://youtu.be/QEpxtiN8Trc.
Y. Shapira, "SixtySec SC-FDMA vs. OFDMA"; Web-Video; Date Posted: May 1, 2012; ScreenPrint; Explore Gate; YouTube Video URL=http://youtu.be/dr4YQAfifKA.
Y. Shapira, "SixtySec LTE HSS—Home Subscriber Server"; Web-Video; Date Posted:Mar. 26, 2012; ScreenPrint; Explore Gate; YouTube Video URL=http://youtu.be/M8rd5HC2S8I.
Y. Shapira, "SixtySec LTE eNB"; Web-Video; Date Posted:Mar. 26, 2012; ScreenPrint; Explore Gate; YouTube Video URL=http://youtu.be/pBh9-CDBYcY.
Y. Shapira, "SixtySec LTE PCRF"; Web-Video; Date Posted: May 28, 2012; ScreenPrint; Explore Gate; YouTube Video URL=http://youtu.be/ie2H5LHaYY8.
C. Gessner, A.Roessler: "Long Term Evolution (LTE) Presentations"; May 2009; Rohde & Schwarz; ScreenPrint; EventHelix Video URL=http://www.eventhelix.com/lte/tutorial/web-presentation.htm#.Uyh2tPnKujQ.

\* cited by examiner

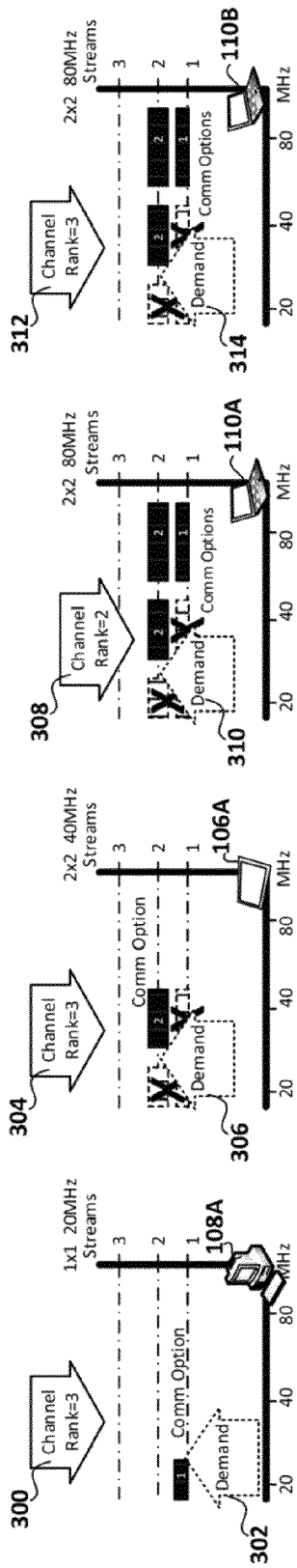
FIG. 3A
FIG. 3B
FIG. 3C
FIG. 3D
Determine Communication Options for Each Station
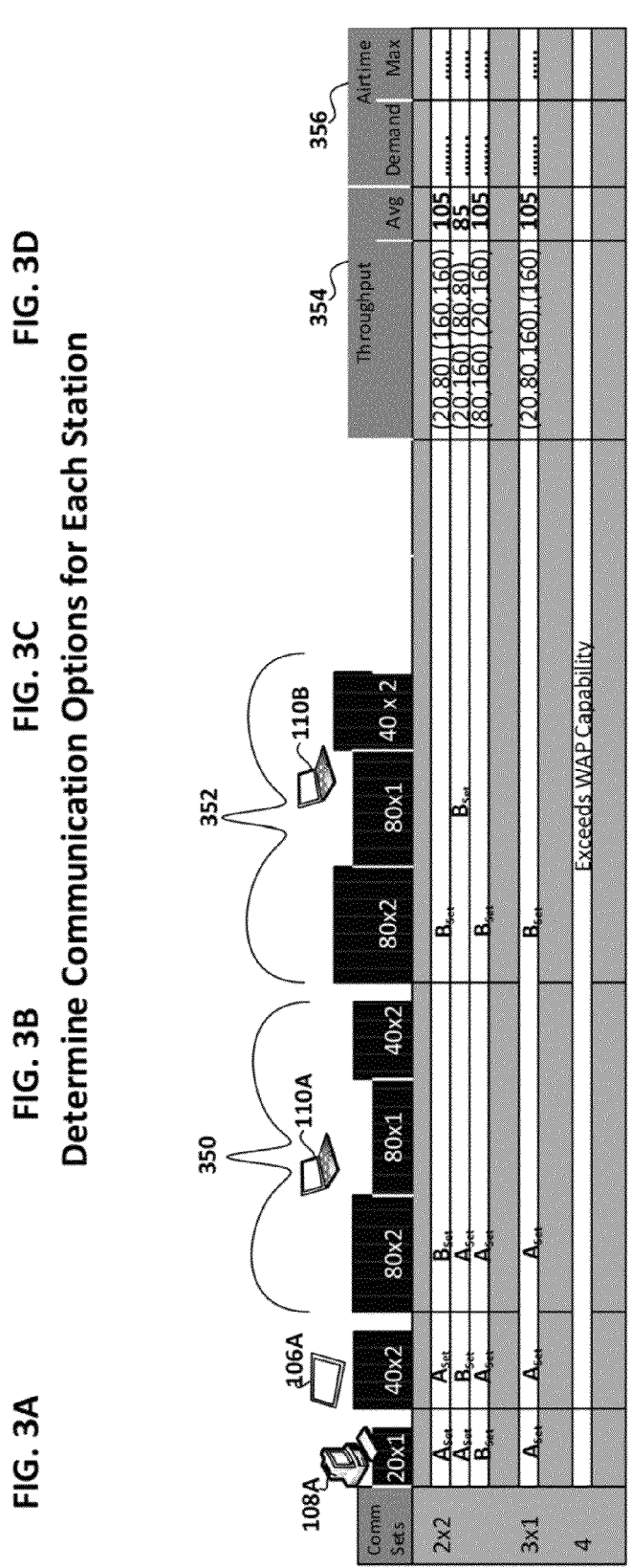
FIG. 3E  Identify Station Sets with Complementary Communication Options & Rank Sets PRIOR ART Multi-User MIMO SISO/MIMO WAP with Complementary Sub-Nets MIMO WAP supporting Complementary Subnets

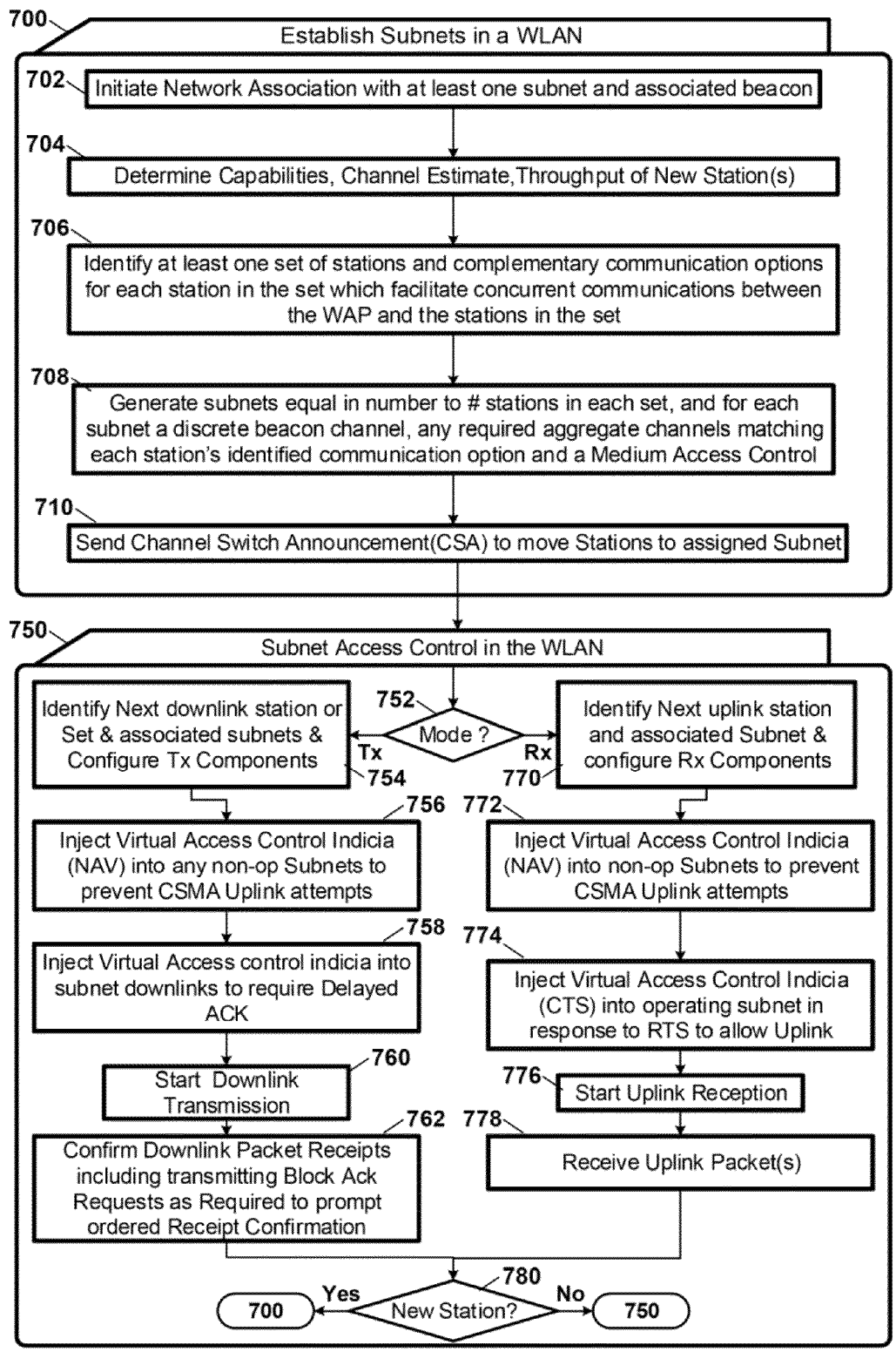
Operating Multiple Subnets on a WLAN   FIG. 7

WAP SUPPORTING COMPLEMENTARY SUBNETS IN A WLAN

CROSS REFERENCE TO RELATED APPLICATION

This application claims the benefit of prior filed Provisional Applications No. 61/806,332 filed on Mar. 28, 2013 entitled "Adaptive Controller Design for Multiple Radio Frequency Transceivers" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods of multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers, tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus for a wireless access point (WAP) apparatus which supports concurrent communications with all IEEE 802.11 stations including those that do not support multi-input multi-output (MIMO) communications or multi-user (MU) MIMO communications.

In an embodiment of the invention a WAP having one or more antennas and supporting wireless local area network (WLAN) communications with a plurality of station nodes on a plurality of orthogonal frequency-division multiplexed (OFDM) sub-channels is disclosed. The WAP includes: a station set identifier and a subnet controller. The station set identifier is configured to identify at least one set of at least two station nodes among the plurality of station nodes and complementary communication options for each station in the at least one set which facilitate concurrent communications between the WAP and the stations in the set. The subnet controller is configured both to generate subnets equal in number to a number of stations in at least one set, and for each subnet an associated beacon channel discrete from the beacon channels of other subnets, together with any required aggregate channels matching each station's identified communication option and an associated medium access control, and further to control transmission of data from the WAP to the at least two station nodes concurrently on the associated subnets, thereby supporting concurrent downlink transmissions to station nodes including those which do not support at least one of multiple-input multiple-output (MIMO) communications or multi-user (MU) MIMO communications.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 3A-D are graphs showing communication capabilities and communication options for representative stations on the WLAN and FIG. 3E is a table showing various sets of stations and a communication option for each station complementary to the communication options of other stations in the set, and the relative rankings of each set, in accordance with an embodiment of the invention;

FIG. 7 is a process flow diagram of processes associated with a WAP supporting concurrent links to stations without the requirement for MU-MIMO, in accordance with an embodiment of the current invention.

DETAILED DESCRIPTION OF THE EMBODIMENTS

The present invention provides a method and apparatus for increasing communicating with stations concurrently without using the IEEE 802.11ac (Wave 2) MU-MIMO protocol.

MU-MIMO is a technique whereby multiple independent transmissions are sent simultaneously to a number of receivers. The transmissions are precoded in such a way that the respective receive signals are free of mutual interference. Precoding coefficients are chosen in such a way that interference is eliminated at the antennas of the different receivers. Stations eligible for inclusion in a group must support the IEEE 802.11ac (Wave 2) specification, and the MU protocol set forth therein. This constraint severely limits the number of stations which can be included in multi-user groups and excludes billions of existing wireless devices which only support one or more of prior wireless standards, such as: IEEE 802.11 "a", "b", "g", "n" and "ac (Wave 1)".

FIGS. 1A-D are respectively a system view, a bandplan, a timing diagram, and time sequenced bandplan of a Prior Art wireless local area network (WLAN) exhibiting limited support for multi-user (MU) multiple-input multiple-output (MIMO) wireless communications. Prior Art MU MIMO as implemented in the IEEE 802.11ac standard and specifically 'Wave 2' thereof, is intended to enable the WAP to communicate with multiple devices concurrently, thereby increasing the time available for discrete MIMO video links to wireless HDTVs, computers tablets and other high throughput wireless devices the communication capabilities of which rival those of the WAP 102. This prior art case is shown in FIGS. 1A-D.

Figure 1A:
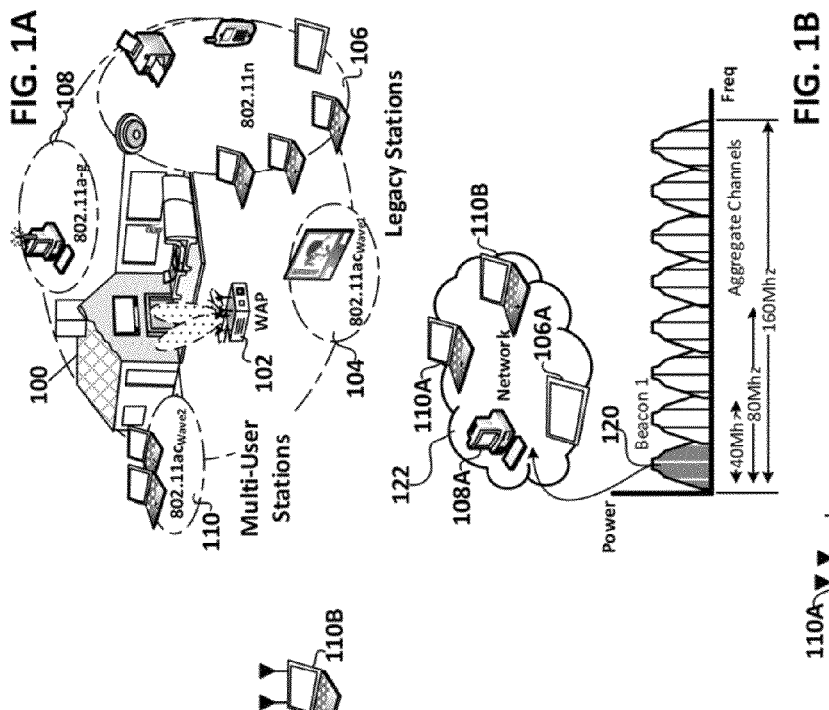
FIGS. 1A-D are respectively a system view, a bandplan, a timing diagram, and a time sequenced bandplan of a Prior Art wireless local area network (WLAN) exhibiting limited support for multi-user (MU) multiple-input multiple-output (MIMO) wireless communications.

FIG. 1A is a system view of WAP 102 servicing multiple wireless devices/stations in a home 100. The WAP is a 4×4 device meaning it has have four antennas and internally supports up to four transport streams. Three types of Legacy stations, i.e. those that do not support the IEEE 802.11ac (Wave 2) standard are shown. The first type of legacy stations 108 are those which only support one or more of the IEEE 802.11 "a", "b" or "g" standards. The second type of legacy stations 106 are those which only support IEEE 802.11 "n" or prior standards. The third type of legacy stations 104 are those which only support IEEE 802.11 "ac" (Wave 1) or prior standards. Although these legacy devices do support broadcast of the same content to multiple recipients, i.e. Multicast transmission, none of them support concurrent discrete transmissions to multiple stations. The only stations 110 that are able to support MU-MIMO are those that are compliant with the IEEE 802.11ac (Wave 2) standard, i.e. stations 110.

Figure 1B:
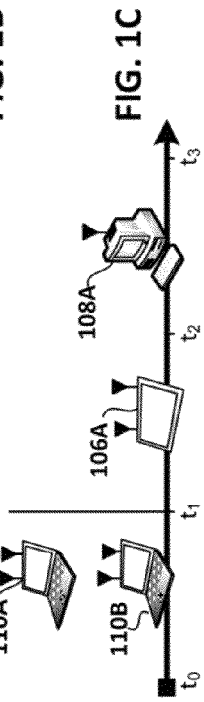

FIG. 1B is a bandplan showing a representative portion of an IEEE 802.11ac bandplan with a single beacon channel 120 supporting medium access control (MAC) for all stations 106A, 110A-B and 108A on the WLAN 122. Adjacent aggregate channels all of which include at least the beacon channel may be used as demand requires to expand communications bandwidth beyond the 20 MHz beacon/primary channel to: 40 MHz, 80 MHz or 160 MHz bandwidth communications between the WAP and each station in the WLAN as required.

Figure 1C:
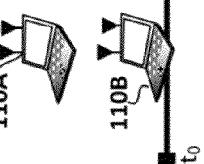

FIG. 1C is a timing diagram. The stations receiving concurrent or discrete communications from WAP 102 are shown. The WAP uses MU-MIMO precoding to concurrently transmit discrete communications in the same time interval, $t_0$-$t_1$ and shared channel to notebook computers 110A, 110B. Both computers 110A, 110B are compliant with the IEEE 802.11ac (Wave 2) wireless communication standard including support for MU sounding and framing. The prior art WAP 102, lacks support for concurrent communications with legacy devices which do not support the IEEE 802.11ac (Wave 2) standard, and thus communicates serially with these legacy devices. In successive time intervals $t_1$-$t_2$ and $t_2$-$t_3$ the prior art WAP 102 communicates serially with legacy devices 106A, 108A respectively.

Figure 1D:
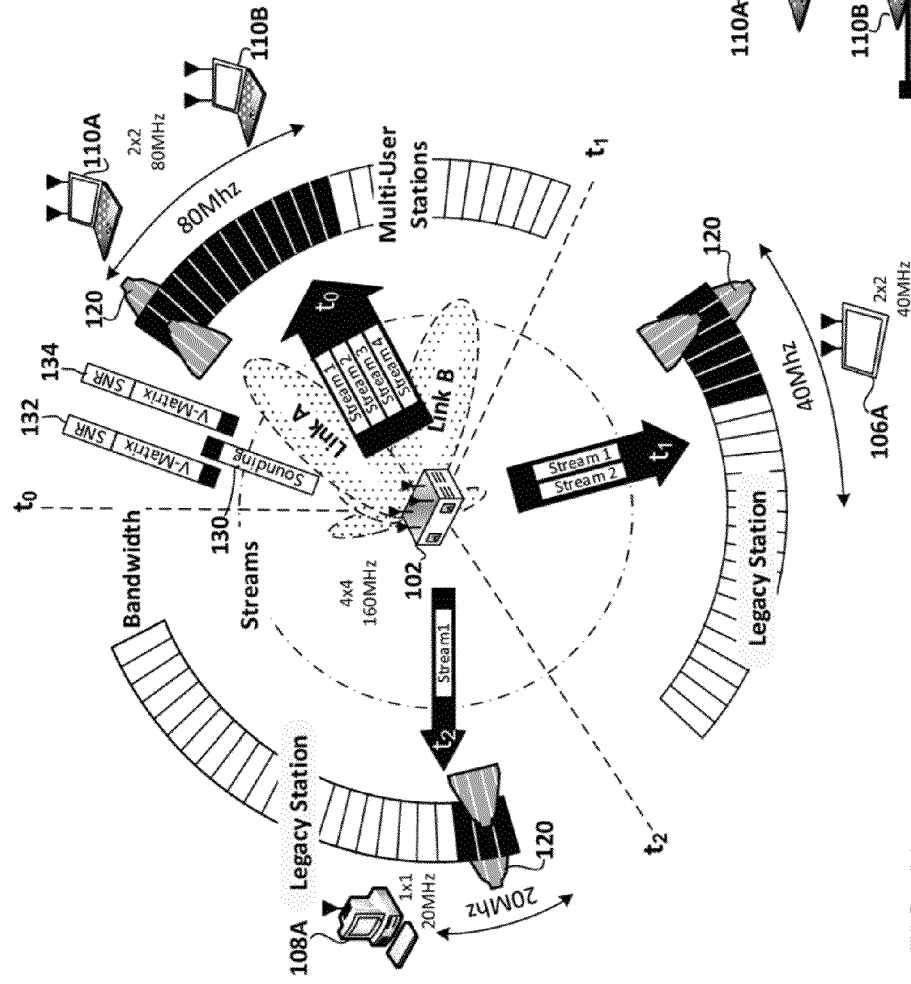

As shown in FIG. 1D, 802.11ac (Wave 2) compliant devices 110A-110B can be aggregated into an MU-MIMO group with a concomitant reduction in airtime usage resulting from the ability of the WAP to concurrently rather than serially transmit discrete data to two or more such devices in an MU group. The notebook computers 110A, 110B in the MU-MIMO group serviced in time interval $t_0$-$t_1$ are shown as 2×2 devices meaning they have two antennas and internally support up to two transport streams. Each is shown as having the same maximum bandwidth, e.g. 80 MHz and the same beacon channel 120. Any devices participating in a prior art MU-MIMO group are subject to an initial MU channel sounding 130 from the WAP and responses 132-134 from each targeted user device in which indicia for the associated channel are returned, i.e. the $V^H$ matrix and Signal-to-Noise Ratios (SNR).

In the event stations in a prior art MU-MIMO group did not have matching bandwidths, the bandwidth, under the IEEE 802.11ac (Wave 2) standard is limited to that of the group member with the narrowest bandwidth. In other words, if one MU-MIMO group member supported 20 MHz and the others 160 MHz the maximum bandwidth for MU-MIMO under the IEEE 802.11ac (Wave 2) standard would be 20 MHz because the MU Frame header specified in that standard only has one bandwidth field for indicating the common bandwidth to all stations in the MU-MIMO group.

In the example shown in FIG. 1D, communications to legacy stations 106A and 108A can not take place concurrently due to the lack of support for the IEEE 802.11ac (Wave 2) MU-MIMO protocol. Thus they are communicated with sequentially in time intervals $t_1$-$t_2$ and $t_2$-$t_3$ respectively rather than concurrently. Communications with legacy station 106A in time in interval $t_1$-$t_2$ spans 40 MHz using two transport streams which is the maximum bandwidth for legacy station 106A. Communications with legacy station 108A in time in interval $t_2$-$t_3$ spans 20 MHz using one transport stream which is the maximum bandwidth for legacy station 108A.

Figure 2A:
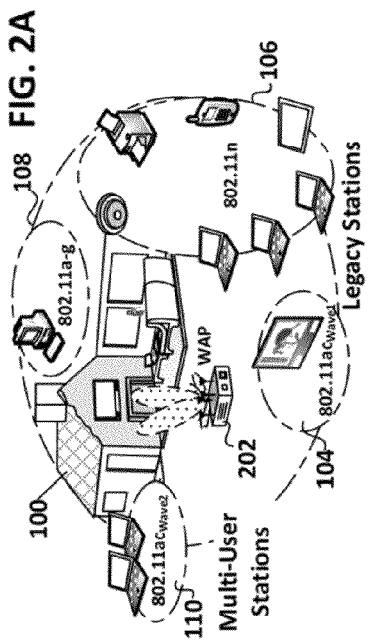
FIGS. 2A-D are respectively a system view, a bandplan, a timing diagram, and a time sequenced bandplan of a WLAN in accordance with an embodiment of the invention which expands the types of stations which can be concurrently communicated with in accordance with and does not required MU-MIMO to do so, in accordance with an embodiment of the invention.

FIGS. 2A-D are respectively a system view, a bandplan, a timing diagram, and a time sequenced bandplan of a WLAN in accordance with an embodiment of the invention which expands the types of stations which can be concurrently communicated with in accordance with and does not required MU-MIMO to do so, in accordance with an embodiment of the invention;

FIG. 2A is a system view of WAP 202 servicing multiple wireless devices/stations in a home 100. The WAP is a 4×4 device meaning it has have four antennas and internally supports up to four transport streams over a maximum bandwidth of 160 MHz. Three types of Legacy stations, i.e. those that do not support the IEEE 802.11ac (Wave 2) standard, are shown. The first type of legacy stations 108 are those which only support one or more of the IEEE 802.11 "a", "b" or "g" standards. The second type of legacy stations 106 are those which only support IEEE 802.11 "n" or prior standards. The third type of legacy stations 104 are those which only support IEEE 802.11 "ac" (Wave 1) or prior standards. Although these legacy devices do support broadcast of the same content to multiple recipients, i.e. Multicast transmission, none of them support concurrent discrete transmissions to multiple stations. The only stations 110 that are able to support MU-MIMO are those that are compliant with the IEEE 802.11ac (Wave 2) standard, i.e. stations 110.

Figure 2B:
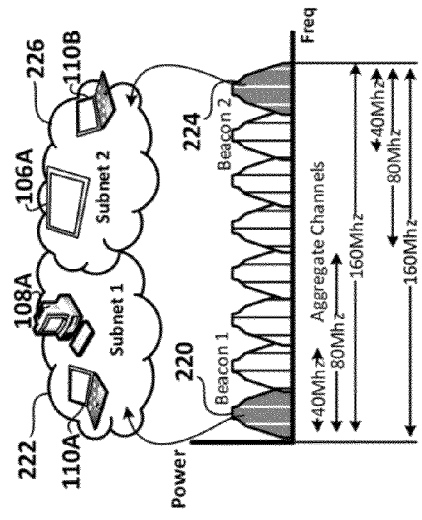

FIG. 2B is a bandplan showing a representative portion of an IEEE 802.11ac bandplan with two beacon channels 220, 224 each supporting a discrete subnet 222 and 226 respectively. Each subnet has an associated medium access control (MAC) for the stations. Subnet 222 includes stations 108A and 110A associating with WAP beacon 220 at bandwidths ranging between 20 MHz and 160 MHz using the aggregate of one or more of the adjacent communication channels. Subnet 226 includes stations 106A and 110B associating with beacon 224 at bandwidths ranging between 20 MHz and 160 MHz using the aggregate of one or more of the adjacent communication channels. Collectively the two subnets comprise the WLAN. These adjacent aggregate channels all of which include the corresponding one of the two beacon channels 220,224 may be used as demand requires to expand communications bandwidth beyond the 20 MHz beacon/primary channel to: 40 MHz, 80 MHz or 160 MHz bandwidth communications between the WAP and each station in the WLAN as required.

Figure 2C:

FIG. 2C is a timing diagram. The stations receiving concurrent or discrete communications from WAP 202 are shown. The WAP 202 uses the two subnets and associated beacons to concurrently transmit discrete communications in the same time interval, $t_0$-$t_1$ to notebook computers 110A, 110B which form the first concurrent transmission 'Set A'. The concurrent downlink communications do not require MU-MIMO, nor the precoding nor channel sharing associated therewith. Rather concurrent communications are handled on discrete subnets each with their own discrete beacon. These concurrent communications are possible irregardless of support by the stations, or for that matter the WAP for MU-MIMO. In the next time interval $t_1$-$t_2$ the WAP 202 communicates concurrently with the legacy stations 106A, 108A on their associated discrete subnets. These stations are members of the second concurrent transmission 'Set B' The total time required for the WAP 202 to service all stations on the WLAN and bandwidth available for downlink communications on each subnet are both considerably improved over the prior art case shown in FIGS. 1A-D.

Figure 2D:
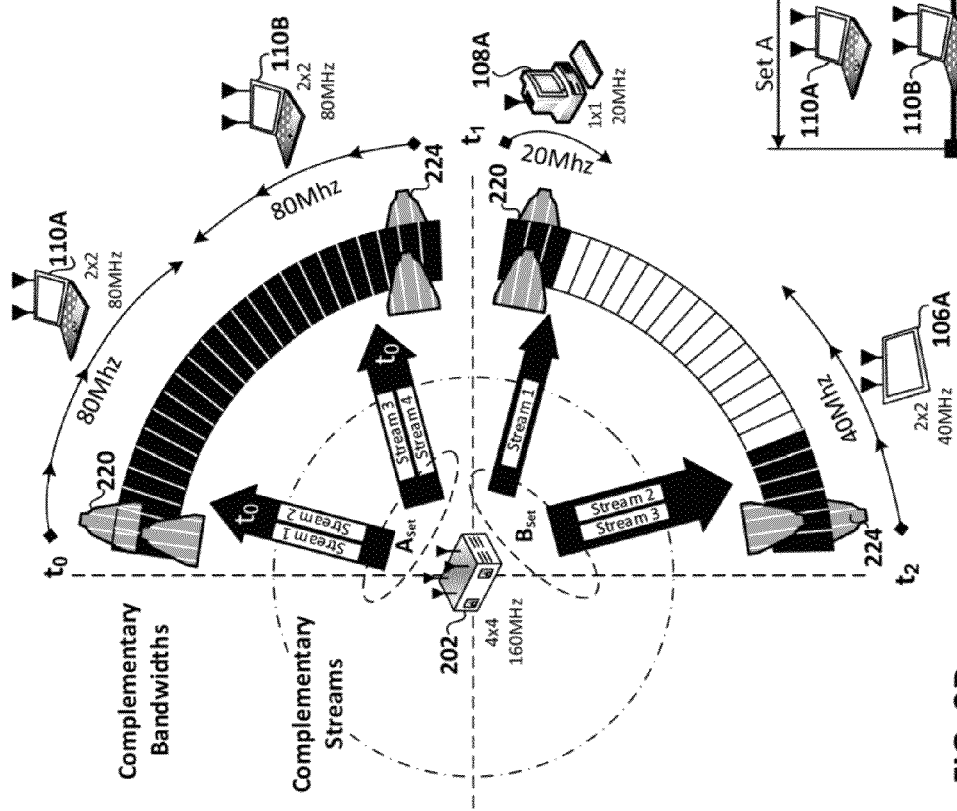

As shown in FIG. 2D, 802.11ac (Wave 2) compliant devices 110A-110B form a first transmission set, a.k.a $A_{set}$ or Set A which is serviced in the first time interval $t_0$-$t_1$. The notebook computers 110A, 110B are each serviced on their own subnets 222, 226 respectively each with a dedicated beacon 220, 224 respectively. Each associated subnet is allocated a discrete 80 MHz bandwidth and a pair of transport streams each for the concurrent downlink from the WAP. No MU-MIMO sounding is required.

In the next time interval the stations forming the second transmission set, a.k.a $B_{set}$ or Set B, i.e. stations 106A, 108A are serviced concurrently in the second time interval $t_1$-$t_2$. Each is associated with a different beacon and associated subnet. Station 108A is associated with beacon 220 and subnet 222. Station 106A is associated with beacon 224 and subnet 226. Each station is allocated their own bandwidth and transport streams, e.g. 20 MHz with one transport stream for the downlink to computer 108A and 40 MHz with two transport streams for the concurrent downlink to tablet 106A. There is no requirement for the lowest common denominator bandwidth as is the case with prior art MU-MIMO.

FIGS. 3A-D are graphs showing communication capabilities and communication options for representative stations on the WLAN. FIG. 3E is a table showing various sets of stations and a communication option for each station complementary to the communication options of other stations in the set, and the relative rankings of each set, in accordance with an embodiment of the invention.

As each station associates with the WAP its communication capabilities are determined, e.g. maximum bandwidth and number of transport streams supported. In an embodiment of the invention the WAP determines the communication channel between itself and each station using either the reverse channel from the station to the WAP, a.k.a. implicit sounding, or by receiving a channel estimate from the station, a.k.a. explicit sounding. Additionally in an embodiment of the invention the data demand, e.g. Mbps, of each station may be estimated, based for example on: station capabilities; data type, e.g. file transfer, audio streaming or video streaming and quality of service (QOS). In this embodiment of the invention the WAP determines the normative communication options for each associated station as shown in FIGS. 3A-D and removes selected ones of these options based on channel rank and condition and on estimated demand to determine the actual communication options.

FIGS. 3A-D are graphs with a vertical axis corresponding to the communication transport stream options supported by the corresponding station and a vertical axis corresponding to the communication bandwidth options supported by the corresponding station. FIGS. 3A-D show these communication capabilities for wireless: computer 108A, tablet computer 106A, notebook computer 110A and notebook computer 110B respectively. In FIG. 3A computer 108A has a single communication option comprising a bandwidth of 20 Mhz over a single transport stream. In FIG. 3B tablet computer 106A initially has four communication options, e.g. a single transport stream with a 20 Mhz bandwidth, or a single transport stream with a 40 Mhz bandwidth, or two transport streams with a 20 Mhz bandwidth, or two transport streams with a 40 Mhz bandwidth. In FIG. 3C notebook computer 110A initially has six communication options, e.g. a single transport stream with a 20 Mhz bandwidth, or a single transport stream with a 40 Mhz bandwidth, or a single transport stream with an 80 Mhz bandwidth, or two transport streams with a 20 Mhz bandwidth, or two transport streams with a 40 Mhz bandwidth, or two transport streams with an 80 Mhz bandwidth. Notebook computer 110A shown in FIG. 3D initially has the same communications options as the notebook computer 110A shown in FIG. 3C.

In this embodiment of the invention the WAP adjusts the communication options based on expected or actual communication constraints such as channel rank and condition and estimated demand for each station. In an embodiment of the invention other communication constraints may be considered. These criteria are used to remove some of the normative communication options for each station to reflect the actual communication constraints experienced by each station on the WLAN.

In FIG. 3A the channel 300 estimated between the WAP and station 108A has a rank of 3 which indicates it is uncorrelated enough, e.g. scattered enough to support 3 streams. Since this exceeds the normative stream support on the computer, e.g. 1 stream no adjustment in communication options is called for. Similarly the estimated throughput level, a.k.a. demand 302 of station 108A is low enough so as to be met with the single communication option available, i.e. a single transport stream at 20 Mhz bandwidth.

In FIG. 3B the channel 304 estimated between the WAP and station 106A has a rank of 3 which indicates it will support up to 3 transport streams which exceeds the normative capabilities of the station 106A. Thus no adjustment in communication options is called for. The estimated throughput level, a.k.a. demand 302 of station 106A is high enough so as to eliminate all but one of the normative communication options. The remaining available communication option is two transport streams at 40 Mhz bandwidth.

In FIG. 3C the channel 308 estimated between the WAP and station 110A has a rank of 2 which indicates it will support up to 2 transport streams which matches the normative capabilities of the station 110A. Thus no adjustment in the normative communication options is called for. However, the estimated demand 310 of station 110A is high enough so as to eliminate all but three of the six normative communication options. The remaining three available communication options are: a single transport stream at 80 Mhz bandwidth, or two transport streams at either 40 MHz or 80 Mhz bandwidth.

In FIG. 3D the channel 312 estimated between the WAP and station 110B has a rank of 3 which indicates it will support up to 3 transport streams which exceeds the normative capabilities of the station 110B. Thus no adjustment in the normative communication options is called for. However, the estimated demand 314 of station 110B is high enough so as to eliminate all but three of the six normative communication options. The remaining three available communication options are: a single transport stream at 80 Mhz bandwidth, or two transport streams at either 40 MHz or 80 Mhz bandwidth.

FIG. 3E is a table showing various sets of stations on each row. Each set contains 2 or more stations which will be communicated with concurrently using the discrete stream and bandwidth communication option shown for the set. Each row contains different combinations of sets for a round robin sequence of communications between the WAP and the identified stations in the WLAN. Each column contains a communication option for an associated station. A single actual communication option is shown for each of stations 108A ad 106A. Three communication options 350 are shown in adjacent columns for notebook computer 110A. Three communication options 352 are shown in adjacent columns for notebook computer 110B. In the first row for example, the first concurrent communication set, e.g. the $A_{set}$ includes stations 108A and 106A which will be communicated with concurrently on the discrete bandwidth and stream count communication option identified at the column head. Station 108A will be subject to a 20 Mhz single stream downlink concurrently with a 40 Mhz dual stream downlink to station 106A. Subsequently, the next communication set in this two set by two station each round robin sequence is the $B_{set}$ which includes stations 110A-B. Station 110A will be subject to an 80 Mhz dual stream downlink concurrently with an 80 Mhz dual stream downlink to station 110B. Each row contains other representative round robin sequences and associated sets. The examples are by no means exhaustive.

Each set and or combined round robin sequence of sets is ranked with respect to each other. Ranking criteria in an embodiment of the invention includes throughput 354 and or demand weighted throughput, a.k.a. estimated airtime 356. In an embodiment of the invention the WAP determines which sets to include in its downlink communications based on these rankings.

Figure 4:
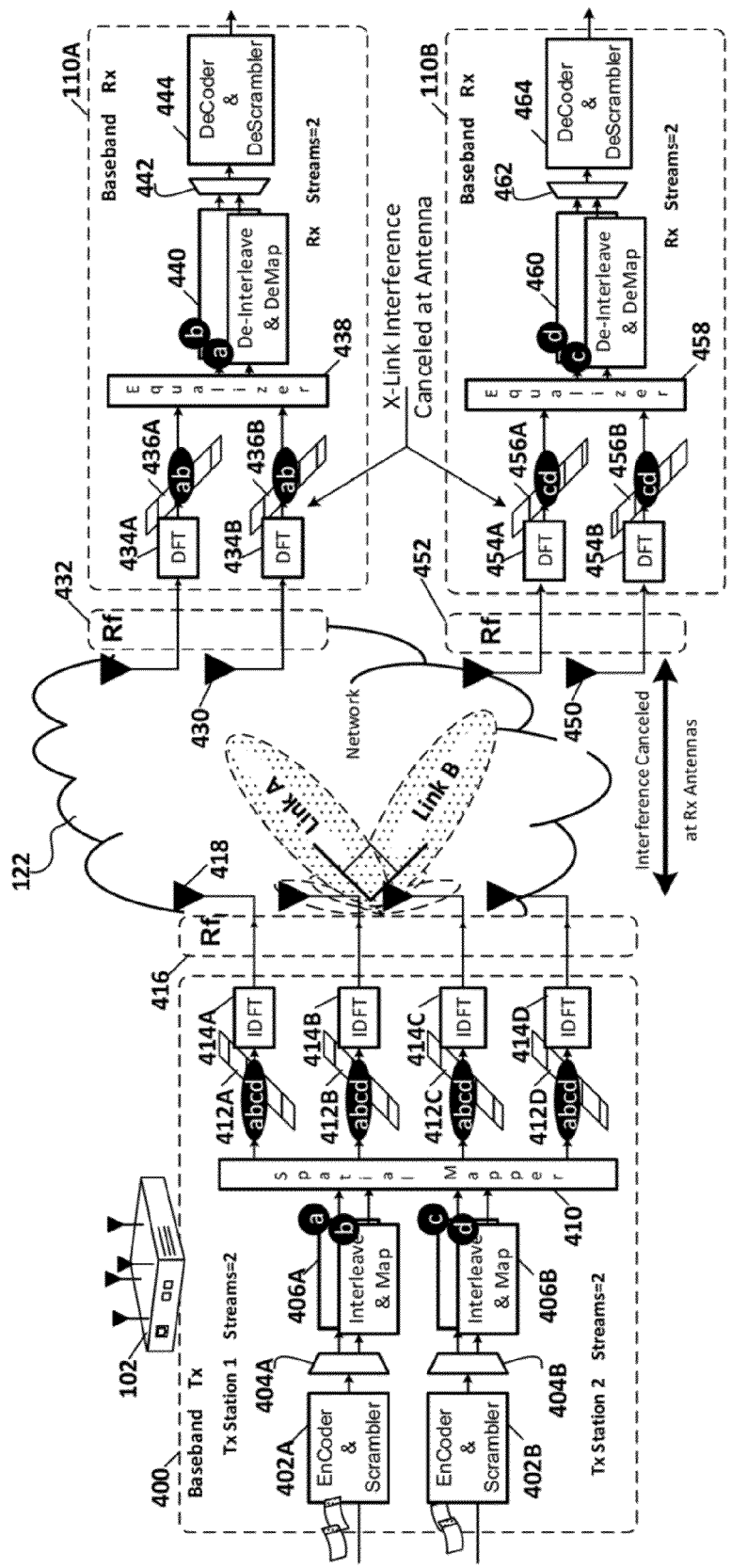
FIG. 4 is a system hardware block diagram of a Prior Art WAP and stations supporting MU MIMO wireless communications.

FIG. 4 is a system hardware block diagram of a Prior Art WAP 102 and stations supporting MU MIMO wireless communications. The WLAN stage 400 of WAP 102 is shown transmitting concurrently to an MU MIMO group comprising stations 110A and 1108. The WAP has 4 antenna 418, and each station has two antenna 430 for station 110A and 450 for station 1108. In WAP 102 communications for user/station 1109A are encoded and scrambled in encoder scrambler module 402A and de-multiplexed into two streams in demultiplexer 404A. Each stream "a", "b" is subject to interleaving and constellation mapping in an associated interleaver mapper 406A and passed to the spatial mapper 410. Communications for user/station 110B are encoded and scrambled in encoder scrambler module 402B and de-multiplexed into two streams in demultiplexer 404B. Each stream "c", "d" is subject to interleaving and constellation mapping in an associated interleaver mapper 406B and passed to the spatial mapper 410. The spatial mapper uses a precoding matrix to precode the two pairs of streams for each user so that they will arrive at their target stations antennas without interference from one another. The combined precoded streams are injected into all OFDM tones 412A-D of the four inverse discrete Fourier Transform (IDFT) modules 414A-D respectively for Radio Frequency (Rf) upconversion in Rf stage 216 and for transmission by each of the WAP's four antenna 418.

The signals received at the antenna 430 of station 110A are free from interference from the communications to station 110B and vice versa. In station 110A the received communications "ab" on each of the two antenna are downconverted in Rf stage 432 and transformed from the time to the frequency domain in discrete Fourier Transform modules 434A-B from which they are output as discrete orthogonal frequency division multiplexed (OFDM) tones/sub-carriers/sub-channels 436A-B. All received streams are then subject to equalization in equalizer 438 implementing either linear or non-linear equalization. Received steams "ab" are subject to de-interleaving and constellation demapping in associated deinterleaver demapper modules 440, followed by multiplexing in multiplexer 442. The received data "ab" is decoded and descrambled in decoder descrambler 444.

The signals received at the antenna 450 of station 110B are also free from interference from the communications to station 110A. In station 110B the received communications "cd" on each of the two antenna are downconverted in Rf stage 452 and transformed from the time to the frequency domain in discrete Fourier Transform modules 454A-B from which they are output as discrete orthogonal frequency division multiplexed (OFDM) tones/sub-carriers/sub-channels 456A-B. All received streams are then subject to equalization in equalizer 458 implementing either linear or non-linear equalization. Received steams "cd" are subject to de-interleaving and constellation demapping in associated deinterleaver demapper modules 460, followed by multiplexing in multiplexer 462. The received data "cd" is decoded and descrambled in decoder descrambler 464.

Figure 5:
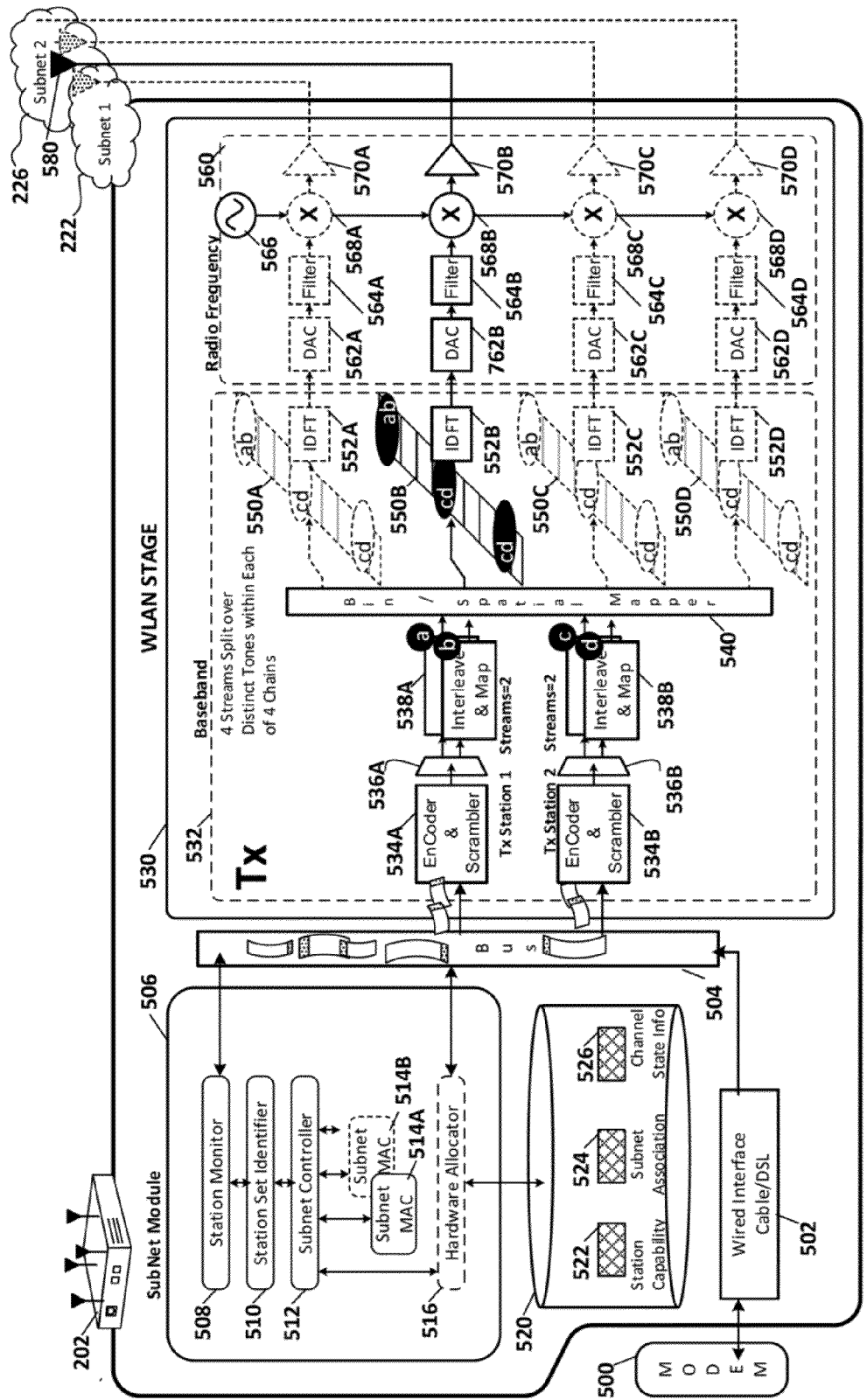
FIG. 5 is a hardware block diagram of a WAP supporting discrete communications with a station or concurrent communications with multiple stations without the requirement for either MIMO or MU-MIMO, in accordance with an embodiment of the invention.

FIG. 5 is a hardware block diagram of a WAP supporting discrete communications with a station or concurrent communications with multiple stations without the requirement for either MIMO or MU-MIMO, in accordance with an embodiment of the invention. The WAP 202 in this embodiment of the invention is identified as a 4×4 WAP supporting as many as 4 discrete communication streams over four antennas 580. In this embodiment of the invention even a single antenna, i.e. 1×1 WAP would be sufficient to practice the applicant's claimed invention.

The WAP couples to the Internet via an integral wired interface 502 to a cable or digital subscriber line (DSL) modem 500. A packet bus 504 couples the modem to the WLAN wireless stage 530. The wireless stage includes a baseband module 532 and a radio frequency module 560 coupled to antennas 580. In FIG. 5 only the transmit components of the baseband and Rf portions of the WAP are shown. The WAP however has a full and complementary set of receive path components and operates for transmitting and receiving communications from all associated wireless stations on its network.

In the baseband portion 532 communications for each user/station are processed. In the embodiment shown two pairs of streams are being processed for discrete MU delivery to two discrete stations/users. The baseband portion is dynamically configurable to support both discrete and communications to a single station as well as concurrent communication to a set of two or more stations. In the example shown a concurrent communication on two discrete subnets 222, 226 to two stations, e.g. 110A-B respectively. The communications "a,b" for the $1^{st}$ subnet 222 are encoded and scrambled in encoder scrambler module 534A and de-multiplexed into two streams in demultiplexer 536A. Each stream "a, b" is subject to interleaving and constellation mapping in an associated interleaver mapper 538A and passed to the spatial mapper 540. Communications for the $2^{nd}$ subnet are encoded and scrambled in encoder scrambler module 534B and de-multiplexed into two streams in demultiplexer 536B. Each stream "c, d" is subject to interleaving and constellation mapping in an associated interleaver mapper 538B and passed to the spatial mapper 540.

The spatial mapper in this embodiment of the invention precodes the streams onto the input bins of each active inverse discrete Fourier transform (IDFT) modules 552A-D with one important distinction over the prior art MIMO implementation. In the prior art MIMO implementation the spatial mapper loads each precoded channel onto all active input bins of the IDFT module associated with each chain. In this embodiment of the invention the spatial mapper only loads each spatial stream onto discrete bins of each IDFT module corresponding to the discrete bandwidth range of the beacon channel and any aggregate channels associated with the corresponding target subnet. Thus as shown in IDFT input bins 550A-D spatially mapped streams labeled "ab" destined for subnet 222 and station 110A are loaded into only those IDFT input bins associated with the discrete bandwidth range of the beacon channel and any aggregate channels associated with the corresponding target subnet 222. Further as also shown in IDFT input bins 550A-D spatially mapped streams labeled "cd" destined for subnet 226 and station 110B are loaded into only those IDFT input bins associated with the discrete bandwidth range of the beacon channel and any aggregate channels associated with the corresponding target subnet 226. The precoded streams are kept separate in the input tone bins 550A-D of each IDFT module 552A-D. The four inverse discrete Fourier Transform (IDFT) modules 552A-D transform these separate streams from the frequency to the time domain for upconvertion in Radio Frequency (Rf) stage 560 and for transmission by each of the WAP's four antenna 580.

The Rf stage includes 4 transmit chains each with their own digital-to-analog converter 562A-D, filter 564-D, upconverter 568A-D and power amplifier 570A-D. Each of the four transmit chains couples to a corresponding one of the WAP's four antenna. A common oscillator 566 drives the upconverters 568A-D.

In an embodiment of the invention three of the output chains are shown with dashed lines. This indicates that this embodiment of the invention can be practiced without MIMO support, on a single input single output (SISO) WAP over a single antenna and associated single chain, provided only that a bin mapper is used in place of the spatial mapper, and performs the critical function of loading the two separate "ab" and "cd" streams on to discrete non-overlapping input bins of the IDFT input, e.g. bins 550B of IDFT 552B associated with the discrete bandwidth range of the beacon channel and any aggregate channels associated with the corresponding target subnets.

The WAP 202 also includes a subnet module 506 coupled to storage 520. The subnet module includes: a station monitor 508, a station set identifier 510, a subnet MAC controller 512 and a hardware allocator 516. In operation the station monitor determines the capabilities of each station, the channel between the WAP and each station, and may also make a throughput rate, a.k.a. demand estimate for same. The station set identifier is configured to identify at least one set of station nodes and complementary communication options for each station in the set which facilitate concurrent communications between the WAP and the stations in the set. In an embodiment of the invention the communication options include various combinations of bandwidth and number of streams available for a concurrent downlink communication with the stations in the set, as shown in FIG. 3E. The subnet controller is configured both to generate subnets equal in number to a number of stations in at least one set, and for each subnet an associated beacon channel discrete from the beacon channels of other subnets, together with any required aggregate channels matching each station's identified communication option and an associated medium access control. The subnet monitor also controls transmission of data from the WAP to the at least two station nodes concurrently on the associated subnets, thereby supporting concurrent downlink transmissions to station nodes including those which do not support at least one of multiple-input multiple-output (MIMO) communications or multi-user (MU) MIMO communications. Storage 520 includes station capability table 522, channel state information records 526 maintained by the station monitor 508. Storage 520 also includes the subnet association table 524 which keeps track of which stations are associated with which subnets and is managed by the station set identifier module.

Figure 6:
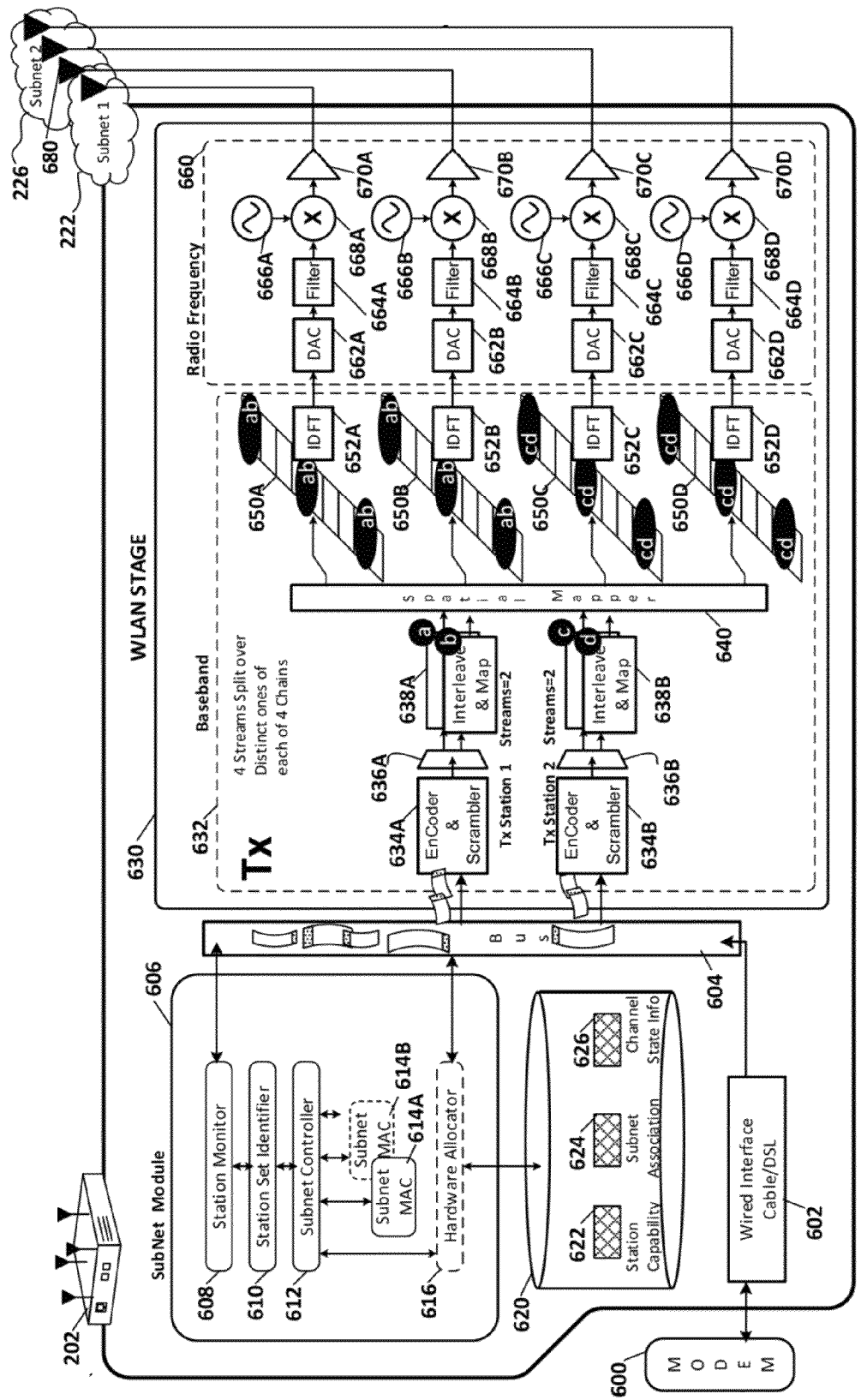
FIG. 6 is a hardware block diagram of a WAP supporting discrete communications with a station or concurrent communications with multiple stations without the requirement for MU-MIMO, in accordance with an alternate embodiment of the invention.

FIG. 6 is a hardware block diagram of a WAP supporting discrete communications with a station or concurrent communications with multiple stations without the requirement for either MIMO or MU-MIMO, in accordance with an embodiment of the invention. The WAP 202 in this embodiment of the invention is identified as a 4×4 WAP supporting as many as 4 discrete communication streams over four antennas 580. In this embodiment of the invention even a single antenna, i.e. 1×1 WAP would be sufficient to practice the applicant's claimed invention.

The WAP couples to the Internet via an integral wired interface 502 to a cable or digital subscriber line (DSL) modem 500. A packet bus 504 couples the modem to the WLAN wireless stage 530. The wireless stage includes a baseband module 532 and a radio frequency module 560 coupled to antennas 580. In FIG. 5 only the transmit components of the baseband and Rf portions of the WAP are shown. The WAP however has a full and complementary set of receive path components and operates for transmitting and receiving communications from all associated wireless stations on its network.

In the baseband portion 532 communications for each user/station are processed. In the embodiment shown two pairs of streams are being processed for discrete MU delivery to two discrete stations/users. The baseband portion is dynamically configurable to support both discrete and communications to a single station as well as concurrent communication to a set of two or more stations. In the example shown a concurrent communication on two discrete subnets 222, 226 to two stations, e.g. 110A-B respectively. The communications "a,b" for the $1^{st}$ subnet 222 are encoded and scrambled in encoder scrambler module 534A and de-multiplexed into two streams in demultiplexer 536A. Each stream "a, b" is subject to interleaving and constellation mapping in an associated interleaver mapper 538A and passed to the spatial mapper 540. Communications for the $2^{nd}$ subhet are encoded and scrambled in encoder scrambler module 534B and de-multiplexed into two streams in demultiplexer 536B. Each stream "c, d" is subject to interleaving and constellation mapping in an associated interleaver mapper 538B and passed to the spatial mapper 540.

The spatial mapper in this embodiment of the invention precodes the streams onto the input bins of each active inverse discrete Fourier transform (IDFT) modules 552A-D with one important distinction over the prior art MIMO implementation. In the prior art MIMO implementation the spatial mapper loads each precoded channel onto all active input bins of the IDFT module associated with each chain. In this embodiment of the invention the spatial mapper only loads each spatial stream onto discrete bins of each IDFT module corresponding to the discrete bandwidth range of the beacon channel and any aggregate channels associated with the corresponding target subnet. Thus as shown in IDFT input bins 550A-D spatially mapped streams labeled "ab" destined for subnet 222 and station 110A are loaded into only those IDFT input bins associated with the discrete bandwidth range of the beacon channel and any aggregate channels associated with the corresponding target subnet 222. Further as also shown in IDFT input bins 550A-D spatially mapped streams labeled "cd" destined for subnet 226 and station 110B are loaded into only those IDFT input bins associated with the discrete bandwidth range of the beacon channel and any aggregate channels associated with the corresponding target subnet 226. The precoded streams are kept separate in the input tone bins 550A-D of each IDFT module 552A-D. The four inverse discrete Fourier Transform (IDFT) modules 552A-D transform these separate streams from the frequency to the time domain for upconvertion in Radio Frequency (Rf) stage 560 and for transmission by each of the WAP's four antenna 580.

The Rf stage includes 4 transmit chains each with their own digital-to-analog converter 562A-D, filter 564-D, upconverter, 568A-D and power amplifier 570A-D. Each of the four transmit chains couples to a corresponding one of the WAP's four antenna. A common oscillator 566 drives the upconverters 568A-D.

In an embodiment of the invention three of the output chains are shown with dashed lines. This indicates that this embodiment of the invention can be practiced without MIMO support, on a single input single output (SISO) WAP over a single antenna and associated single chain, provided only that a bin mapper is used in place of the spatial mapper, and performs the critical function of loading the two separate "ab" and "cd" streams on to discrete non-overlapping input bins of the IDFT input, e.g. bins 550B of IDFT 552B associated with the discrete bandwidth range of the beacon channel and any aggregate channels associated with the corresponding target subnets.

The WAP 202 also includes a subnet module 506 coupled to storage 520. The subnet module includes: a station monitor 508, a station set identifier 510, a subnet MAC controller 512 and a hardware allocator 516. In operation the station monitor determines the capabilities of each station, the channel between the WAP and each station, and may also make a throughput rate, a.k.a. demand estimate for same. The station set identifier is configured to identify at least one set of station nodes and complementary communication options for each station in the set which facilitate concurrent communications between the WAP and the stations in the set. In an embodiment of the invention the communication options include various combinations of bandwidth and number of streams available for a concurrent downlink communication with the stations in the set, as shown in FIG. 3E. The subnet controller is configured both to generate subnets equal in number to a number of stations in at least one set, and for each subnet an associated beacon channel discrete from the beacon channels of other subnets, together with any required aggregate channels matching each station's identified communication option and an associated medium access control. The subnet monitor also controls transmission of data from the WAP to the at least two station nodes concurrently on the associated subnets, thereby supporting concurrent downlink transmissions to station nodes including those which do not support at least one of multiple-input multiple-output (MIMO) communications or multi-user (MU) MIMO communications. Storage 520 includes station capability table 522, channel state information records 526 maintained by the station monitor 508. Storage 520 also includes the subnet association table 524 which keeps track of which stations are associated with which subnets and is managed by the station set identifier module.

FIG. 7 is a process flow diagram of processes associated with a WAP supporting concurrent links to stations without the requirement for MU-MIMO, in accordance with an embodiment of the current invention. Two blocks of processes 700 and 750 are shown. In processes 700 subnets are established on the WLAN and in process 750 subnet access control is set forth for both uplink and downlink.

The first process within block 700 is process 702 in which on bootup network association is initiated for at least one subnet and associated beacon channel. As each new station associates with the WLAN control returns to this block in which the association may take place on any of the existing beacon channels. Control then passes to process 704 in which the capabilities of each station are determined along with an estimate of the channel between the WAP and each station. Also, in an embodiment of the invention the estimated throughput requirements or demand for each station may be determined. Control then passes to process 706 for the identification of at least one set of stations and complementary communication options for each station in the set which facilitate concurrent communications between the WAP and the stations in the set. Control then passes to process 708 in which subnets are generated equal in number to the number of stations in each set, and for each subnet a discrete beacon channel, and any required aggregate channels matching each station's identified communication option, as well as an associated medium access control (MAC) are generated. Control the passes to process 710 in which a IEEE 802.11 channel switch announcement (CSA) is sent to any stations that are assigned to subnets other than the initial one with which they associated with the WSLAN. The CSA is an action frame ("IEEE 802.11 Para. 8.5.2 Spectrum management Action frames") with frame format shown in FIG. 8-436 of section "8.5.2.6 Channel Switch Announcement frame format" in IEEE 802.11-2012 spec. After subnets have been established control passes to process block 750 for the onset of access control on multiple subnets during downlink transmission and also during reception in each of the subnets.

The first of the processes in block 750 is a decision block 752 in which the mode of the WAP, i.e. transmit or reception is determined. In the event the WAP is in transmit mode then control passes to process 754 in which the next downlink station or set of stations identified along with associated subnets. Additionally, the transmit path components are configured to support the assigned subnets or discrete communication channel. Control then passes to process 756 in which a virtual access control indicia is injected into the transmitted packets of any non-operating subnets to revent CSMA uplink during downlink transmission on the identified subnets. In an embodiment of the invention this comprises a NAV field. The NAV field is an information field as mentioned in IEEE 802.11 paragraph "9.3.2.4 Setting and resetting the NAV. And can be distributed in a CTS-to-self frame format as mentioned in "9.3.2.11 NAV distribution" or QoS Null frame as mentioned in "8.3.2.1 Data frame format" in IEEE 802.11-2012 spec. Next control passes to process 758 in which a virtual access control indicia is injected into the subnet downlinks to require a delayed packet receipt acknowledgement (ACK). In an embodiment of the invention the delayed ACK is accomplished via setting Ack policy subfield of QoS control field to "no Ack" as mentioned in "IEEE 802.11 Table 8-6—Ack Policy subfield in QoS Control field of QoS data frames" and "IEEE 802.11 para. 8.2.4.5 QoS Control field" of MAC header of each mpdu packet. Block Ack request frame will be sent to ask station to send Block Ack as mentioned in "8.3.1.8 BlockAckReq frame format". Control then passes to process 762 in which the downlink packet receipts are confirmed using block access requests (BAR) to prompt ordered receipt confirmation from each of the stations in the concurrent set of stations. Control then passes to decision process 780 in which a determination is made as to whether any new station is trying to associate with the WLAN. If a new station is trying to associate control returns to process blocks 700, and if not to process blocks 750.

If, alternately, in decision process 752 the mode of the WAP is switched to reception then control passes to process 770 for the identification of the next uplink station and associated subnet or channel and the Receive components are configured. Control then passes to processes 772 in which a virtual access control indicia, e.g. a NAV field, is injected into non-operating subnets to prevent CSMA uplink attempts during reception of packets from the identified station. Control then passes to process 774 in which a virtual access control indicia such as a clear to send (CTS) is injected into the identified operating subnet in response to a request to send (RTS) to allow the subsequent uplink. Next in process 776 the uplink communication is received and in process 778 the uplink packets are received. Subsequently control passes to decision process 780.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless communication apparatus for providing a wireless local area network (WLAN) to a plurality of wireless stations; and the wireless communication apparatus comprising:
    a wireless access point (WAP) having:
        a plurality of antenna;
        a plurality of shared and discrete components coupled to one another to form transmit and receive chains each coupled to a corresponding one of the plurality of antenna for orthogonal frequency division multiplexed (OFDM) multiple-input multiple-output (MIMO) WLAN communications with the plurality of wireless stations;
        a subnet controller coupled to the plurality of shared and discrete components and configured to generate at least two subnets each associated with corresponding ones of the plurality of wireless stations and for each subnet a discrete communication bandwidth including a beacon channel for wireless station association and communication together with a discrete medium access control (MAC) for collision sense multiple access (CSMA) uplinks from each of the plurality of stations to the WAP, and concurrent downlinks of discrete communications from the WAP to a selected one of the plurality of stations associated with a first of the at least two subnets and to a selected other of the plurality of stations associated with a second of the at least two subnets, thereby improving downlink performance of the WAP; and
    a station set identifier coupled to the subnet controller and configured to identify an association of each of the plurality of stations with a corresponding one of the at least two subnets, by ranking estimated concurrent downlink airtime requirements of various combinations of each of the plurality of stations and station bandwidths for each of the at least two subnets based on an estimated communication demand and throughput capability at various bandwidths of each of the plurality of stations.

2. The wireless communication apparatus of claim 1, having the subnet controller further configured to inject a virtual access control indicia into the concurrent downlinks of discrete communications to the at least two subnets which require delayed acknowledgment (ACK) of the concurrent downlink communications from the WAP and further to order receipt confirmation of the concurrent downlink communications using block ACK requests (BAR) to the one and the other of the plurality of stations.

3. The wireless communication apparatus of claim 1, having the subnet controller further configured to generate the discrete beacon channels together with any additional allocated bandwidth associated with the discrete communication bandwidth for each of the at least two subnets on discrete ones of the communication channels identified in an associated one of the IEEE 802.11 "a", "b", "g", "n" and "ac" communication standards.

4. The wireless communication apparatus of claim 1, wherein the plurality of shared and discrete components coupled to one another to form transmit chains further comprise:
    inverse discrete Fourier transform (IDFT) modules each associated with a corresponding one of the transmit chains for transforming downlink communication streams from a time to a frequency domain and each IDFT module having input bins each associated with a corresponding OFDM sub-channel; and a spatial mapper coupled to the plurality of input bins of each of the IDFT modules for loading the discrete downlink communications for each of the at least two subnets into discrete input bins of each IDFT module corresponding with the discrete communication bandwidth allocated to each of the at least two subnets.

5. A method for operating a multiple-input multiple-output (MIMO) wireless access point (WAP) having a plurality of antennas and for wireless local area network (WLAN) communications with a plurality of stations on a plurality of orthogonal frequency-division multiplexed (OFDM) sub-channels; and the method comprising:

determining communications options for each of the plurality of stations in terms of at least varying bandwidths supported by each;

ranking for concurrent downlink communications, various combinations of the plurality of stations together with communications options for each, based on at least estimated downlink airtime requirements for each combination; and generating at least two subnets and for each subnet a discrete communication bandwidth required to support concurrent downlink communications of a highest ranked combination of stations and communication options as determined in the ranking act and each subnet associated with a discrete subset of the plurality of stations, and including a beacon channel for station association and communication, together with a discrete medium access control (MAC) for collision sense multiple access (CSMA) uplinks to the WAP, and concurrent downlinks of discrete communications from the WAP to each subnet; and transmitting concurrent downlinks of discrete communications from the WAP to a first target station associated with a first of the at least two subnets on the discrete communication bandwidth of the first of the at least two subnets and to a second target station associated with a second of the at least two subnets on the discrete communication bandwidth of the second of the at least two subnets.

6. The method for operating a WAP of claim 5, wherein the transmitting act further comprises:

injecting a virtual access control indicia into the concurrent downlinks of discrete communications to the at least two subnets which indicia require delayed acknowledgment (ACK) of the concurrent downlink communications from the WAP;

ordering receipt confirmations of the downlink communications from the first target station on the first subnet and the second target station on the second subnet using corresponding block ACK requests (BAR); and confirming receipt of the concurrent downlink communications using block ACK requests (BAR) to order receipt confirmations from the one and the other of the plurality of stations.

7. The method for operating a WAP of claim 5, wherein the generating act further comprises:

generating the discrete beacon channels together with any additional allocated bandwidth associated with the discrete communication bandwidth for each of the at least two subnets on discrete ones of the communication channels identified in an associated one of the IEEE 802.11 "a", "b", "g", "n" and "ac" communication standards.

8. The method for operating a WAP of claim 5, further comprising:

loading the discrete downlink communications for each of the at least two subnets into discrete OFDM sub-channels corresponding with the discrete communication bandwidth allocated to each of the at least two subnets.

9. The method for operating a WAP of claim 5, wherein the generating act further comprises:

initiating WLAN association with at least one subnet and an associated beacon channel for the plurality of stations;

identifying stations within the at least one subnet for concurrent downlink communications;

generating the second of the at least two subnets; and sending a channel switch announcement (CSA) to selected ones of the identified stations in the at least one subnet to move to the second of the at least two subnets responsive to the identification act.

* * * * *